(12) United States Patent
Cronkright, II et al.

(10) Patent No.: US 9,150,163 B2
(45) Date of Patent: Oct. 6, 2015

(54) EQUIPMENT CRADLE FOR MOTOR VEHICLES

(71) Applicants: Thomas W. Cronkright, II, Rockford, MI (US); Lawrence R. Duthler, Wyoming, MI (US)

(72) Inventors: Thomas W. Cronkright, II, Rockford, MI (US); Lawrence R. Duthler, Wyoming, MI (US)

(73) Assignee: Mobile Title Agency of Michigan, LLC, Grand Rapids, MI (US)

( * ) Notice: Subject to any disclaimer, the term of this patent is extended or adjusted under 35 U.S.C. 154(b) by 0 days.

(21) Appl. No.: 14/193,660

(22) Filed: Feb. 28, 2014

(65) Prior Publication Data

US 2014/0263515 A1    Sep. 18, 2014

Related U.S. Application Data

(60) Provisional application No. 61/800,447, filed on Mar. 15, 2013.

(51) Int. Cl.
*B60R 7/04* (2006.01)
*B60R 11/02* (2006.01)
*B60R 11/00* (2006.01)

(52) U.S. Cl.
CPC .......... *B60R 11/02* (2013.01); *B60R 2011/0012* (2013.01); *B60R 2011/0059* (2013.01)

(58) Field of Classification Search
CPC .. B60R 7/04; B60R 11/02; B60R 2011/0059; B60R 2011/0012
See application file for complete search history.

(56) References Cited

U.S. PATENT DOCUMENTS

| 4,231,612 | A | * | 11/1980 | Meeker ................... 297/256.13 |
| 4,832,241 | A | * | 5/1989 | Radcliffe ....................... 224/275 |
| 4,936,629 | A | * | 6/1990 | Young ..................... 297/256.12 |
| 5,052,750 | A | * | 10/1991 | Takahashi et al. ....... 297/256.13 |
| 5,277,472 | A | * | 1/1994 | Freese et al. ................... 297/130 |
| 5,397,160 | A | * | 3/1995 | Landry ......................... 296/37.8 |
| 5,479,892 | A | * | 1/1996 | Edwards ....................... 119/771 |
| 5,487,588 | A | * | 1/1996 | Burleigh et al. ............. 297/253 |
| 5,890,762 | A | * | 4/1999 | Yoshida ................... 297/256.13 |
| 6,017,088 | A | * | 1/2000 | Stephens et al. ......... 297/256.16 |
| 6,019,510 | A | * | 2/2000 | Gonzalez et al. ............... 383/22 |
| 6,139,101 | A | * | 10/2000 | Berringer et al. .......... 297/256.1 |
| 6,170,911 | B1 | * | 1/2001 | Kassai et al. ............... 297/250.1 |
| 6,279,798 | B1 | * | 8/2001 | Partch et al. ................... 224/275 |
| 6,422,440 | B1 | * | 7/2002 | Stone ............................ 224/275 |
| 6,588,365 | B2 | * | 7/2003 | Best Wright ................. 119/28.5 |
| 6,626,338 | B1 | * | 9/2003 | Rhodes, Jr. ................... 224/275 |
| 6,705,676 | B1 | * | 3/2004 | Berringer et al. ........ 297/256.16 |
| 6,857,700 | B2 | * | 2/2005 | Eastman et al. ............ 297/250.1 |
| 2002/0163215 | A1 | * | 11/2002 | Emerling et al. ............. 296/24.1 |
| 2003/0160076 | A1 | * | 8/2003 | Lofaro ........................... 224/275 |
| 2005/0046216 | A1 | * | 3/2005 | Herbold et al. ............... 296/37.8 |
| 2005/0176508 | A1 | * | 8/2005 | Chastain ......................... 463/46 |
| 2005/0200169 | A1 | * | 9/2005 | Tipton ..................... 297/188.01 |
| 2010/0327131 | A1 | * | 12/2010 | Carnevali ................... 248/188.6 |
| 2014/0346200 | A1 | * | 11/2014 | Strickland ..................... 224/158 |

* cited by examiner

*Primary Examiner* — Brian D Nash
(74) *Attorney, Agent, or Firm* — Dickinson Wright PLLC

(57) ABSTRACT

An equipment cradle for motor vehicles that is capable of securing equipment during transit in the passenger compartment of motor vehicles, and rests on the motor vehicles seats and is securely coupled to the motor vehicle using the standard Lower Anchors and Tethers for Children (LATCH) Restraint System.

16 Claims, 10 Drawing Sheets

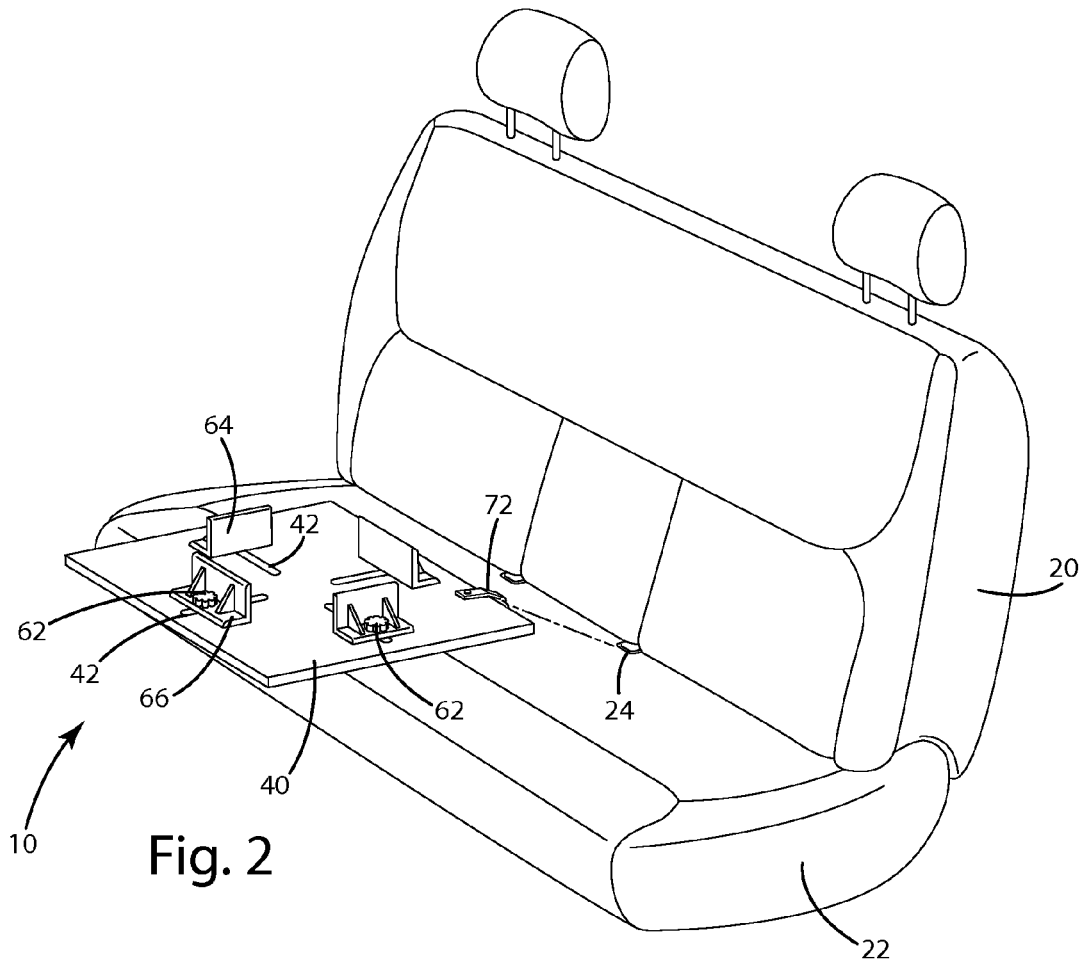
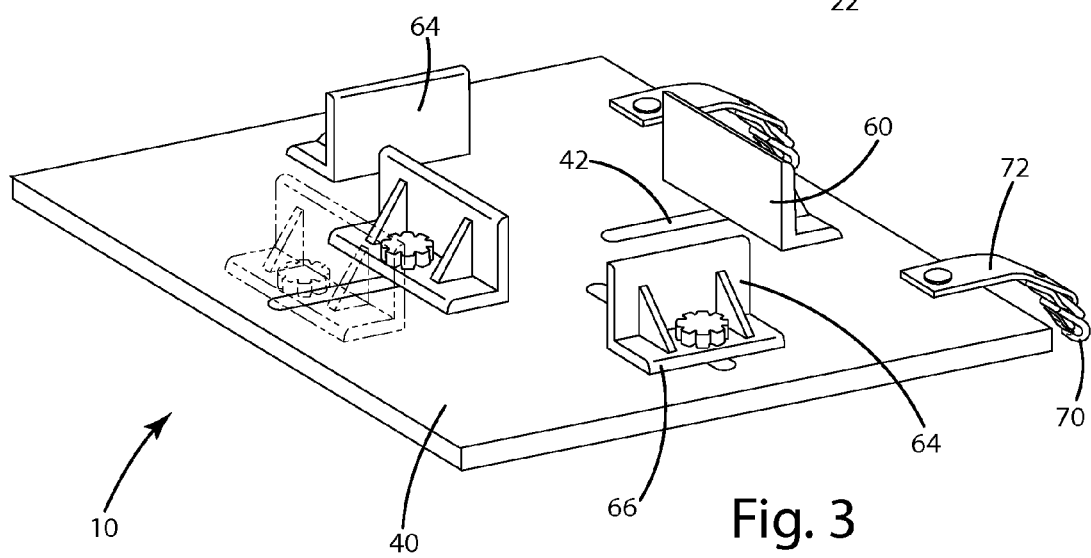

EQUIPMENT CRADLE FOR MOTOR VEHICLES

CROSS-REFERENCE TO RELATED APPLICATION

This U.S. utility patent application claims the benefit of a provisional application Ser. No. 61/800,447 filed on Mar. 15, 2013 entitled "Equipment Cradle For Motor Vehicles," the entire disclosure of the application being considered part of the disclosure of this application, and hereby incorporated by reference.

BACKGROUND OF THE INVENTION

1. Field of the Invention

An equipment cradle for motor vehicles that is capable of securing equipment during transit in the passenger compartment of motor vehicles, and specifically an equipment cradle that is easily added to and removed from the motor vehicle even when equipment is attached, and more specifically an equipment cradle that rests on a motor vehicle's seats and is securely coupled to the motor vehicle using the standard Lower Anchors and Tethers for Children (LATCH) Restraint System.

2. Description of the Prior Art

Traditionally there has been no good way to transport equipment, particularly office equipment such as printers and multifunction machines safely and useable in the passenger compartment of motor vehicles. Many employees, agents and other personal or small business owners need to create, process and upload documents remotely from an office. Examples of such individuals are mobile notaries, real estate agents, insurance adjustors, sales persons, medical care providers, field agents, and the like. As mobile data access has grown, there is a need and benefit for the remote printing, scanning and copying of documents. Most of these functions when in a physical office and performed with readily available office equipment, such as multifunction printers. While some individuals have attempted to hook up multiple function printers to a power convertor and buckle the unit to the seat of a vehicle, this is generally an unsafe method as the seat belts are not configured to securely hold such equipment in position, particularly under heavy braking, quick acceleration, sharp cornering, or even in a crash situation where the equipment is subjected to extreme force in a single direction or multiple directions. In particular, while some individuals and companies have attempted to place the smallest multifunction device in a vehicle, for most individuals, including real estate agents and mobile notaries, a small multi-function printer is not designed for, not reliable and not convenient for printing large closing packages and transaction documents which regularly exceed one hundred pages. The smallest of the large multifunction printers typically used for large print jobs easily weigh 40-50 or more pounds. To address the problems listed above, many companies, employees and agents purchase specially configured vehicles, such as a van or the like and reconfigure it into a mobile office. The necessary office equipment is permanently bolted in place, making the vehicle unusable in other settings and applications. Therefore, an expensive vehicle, typically $30,000-$40,000 or more after reconfiguration into a mobile office has a limited use and purpose. As such, many individuals companies cannot afford these limited use vehicles. Therefore, there is a need for a solution that safely and quickly allows a standard vehicle to transport in a useable configuration office equipment and quickly be converted back to a passenger vehicle.

SUMMARY OF THE INVENTION

The cradle of the present invention fits in a single passenger seat of a vehicle and securely attaches to the vehicle using the Lower Anchors and Tethers for Children (LATCH) Restraint System. Two adjustable straps are integrated into the cradle and have clips that extend off the back which are connected to the LATCH system of the vehicle. Under and towards the rear of the cradle, there is an adjustable dense foam (or other material) that can be adjusted to accommodate the contours of various vehicle seat cushions. On the top of the cradle, there are at least two clamps or brackets that hold the printer to the cradle. The clamps would be molded to fit into the bottom handles or contours of the equipment. One bracket and one clamp is fixed and one is adjustable (sliding in grooves and tightened once in position such as with an alien wrench type system) to accommodate equipment of different widths (both clamps may ultimately be adjustable). The cradle could also come with multiple styles of clamps to accommodate different equipment shapes (i.e. clamps are removable and interchangeable). The cradle may also have equipment specific clamps or brackets or may be provided with multiple clamps. Depending on the type of equipment, there may also be a strap that goes from the front of the cradle, over the equipment and then to the back of the cradle for additional strength. Any such strap may be quick release for a printer/copier that has a hinged top that opens).

BRIEF DESCRIPTION OF THE DRAWINGS

FIG. 2 is a perspective view of the equipment cradle and seat of FIG. 1 showing the attachment to a LATCH system on the vehicle seat;

FIG. 3 is a front top perspective view of the equipment cradle in FIG. 1;

DETAILED DESCRIPTION OF THE INVENTION

Figure 1:
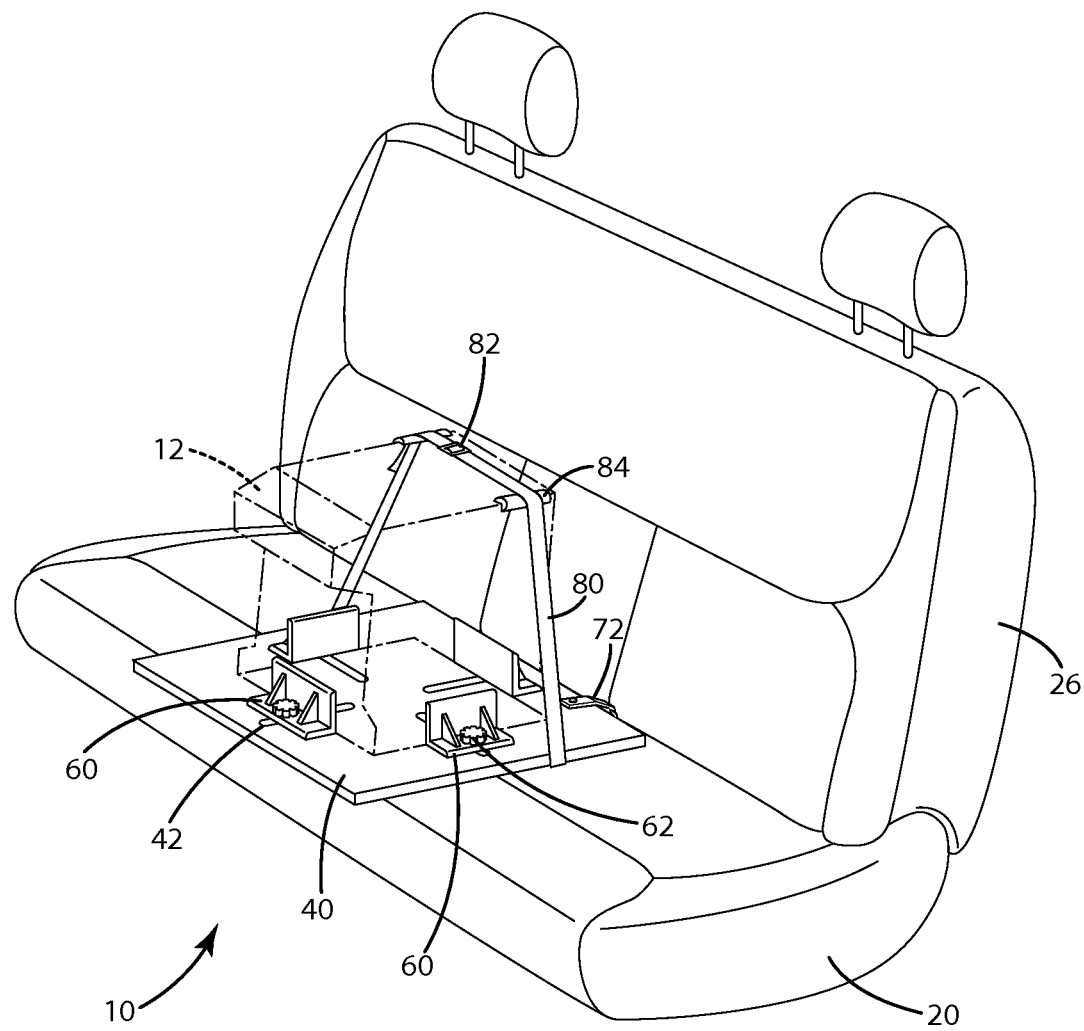
FIG. 1 is a perspective view of the present invention equipment cradle securing a printer to an exemplary vehicle seat.

The present invention, as illustrated in FIG. 1, is directed to an equipment cradle 10 configured to securely hold equipment 12 safely in a vehicle, and more specifically within the passenger compartment of the vehicle. The cradle 10 is supported by and anchored to a vehicle seat 20. The cradle 10 generally includes a base 40 having at least one moveable support brackets 60 and latches 70 for coupling to the lower seat anchors 24 on the seat 20.

Figure 12:
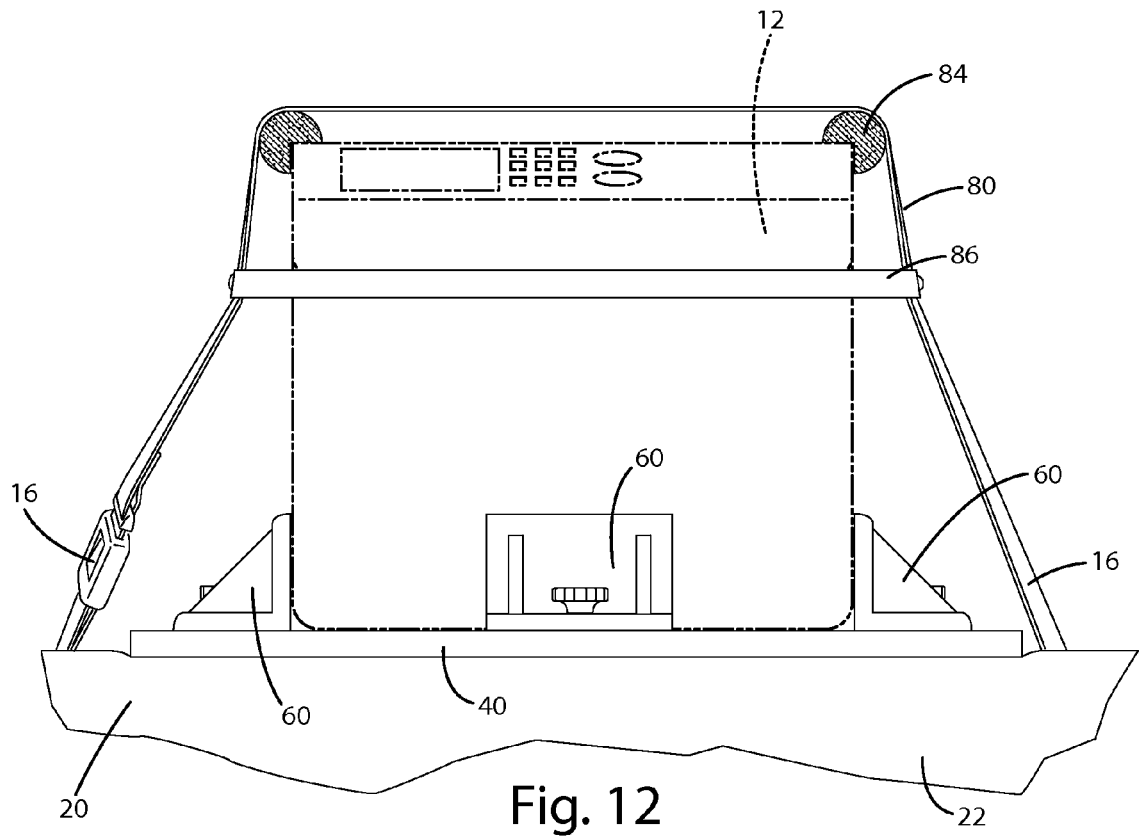
FIG. 12 is an exemplary front view of an equipment cradle using a vehicle seatbelt to secure the equipment cradle to a vehicle seat.
Figure 13:
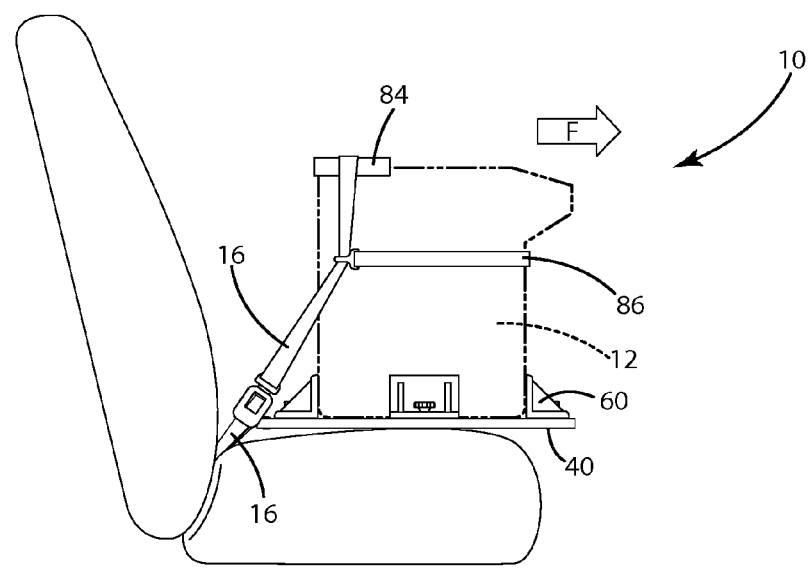
FIG. 13 is a side view of the equipment cradle in FIG. 12.

The cradle 10 is configured to work with passenger vehicles and more specially be supported by the seat 20 of a vehicle, more particularly on the illustrated exemplary seat base 22. While, as illustrated in FIGS. 12 and 13, the cradle may be configured to work with seatbelts 16, it is more preferably configured to work with the standard Lower Anchors and Tethers for Children (LATCH) Restraint System common in passenger vehicles. The lower anchor 24 as illustrated in FIG. 2 is generally a standardized "U" shaped bar or the like attached to the vehicle seat frame (not shown) and normally provides a secure attachment point for baby and child seats to be installed in vehicles. The lower anchor 24 is generally located between the seat base and the seat back 26 on the seat 20.

Figure 14:
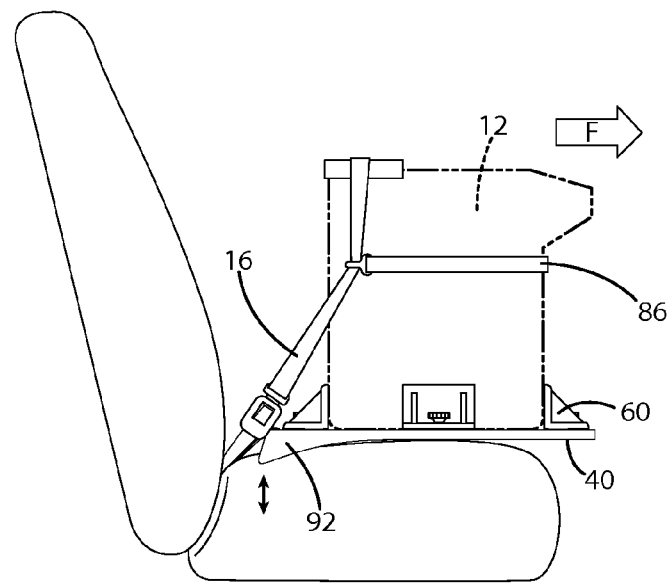
FIG. 14 is side view of an equipment cradle with a contoured base.
Figure 18:
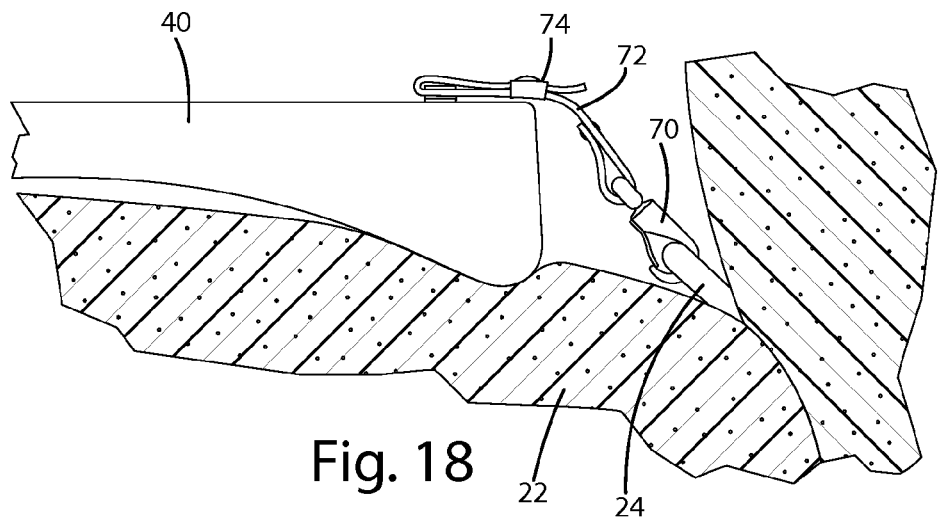
FIG. 18 is a partial side view of the contoured equipment cradle with exemplary adjustable anchor latches.

The cradle 10 includes the base 40, brackets 60 coupled to the base 40, and latches 70 extending from the base 40. The base 40 may be a flat sheet as illustrated in FIGS. 1-15, contoured to match the contour of most seats 20, specifically the seat base 22 as illustrated in FIGS. 14 and 18, and as further illustrated in FIG. 14 the contour may include an adjustable level portion 92. The adjustable level portion 92 is configured to allow the height of the contoured portion to change to match the wide variety of seat shapes and sizes. Of course, using a substantially flat sheet of material for the base 40 reduces manufacturing costs.

Figure 4:
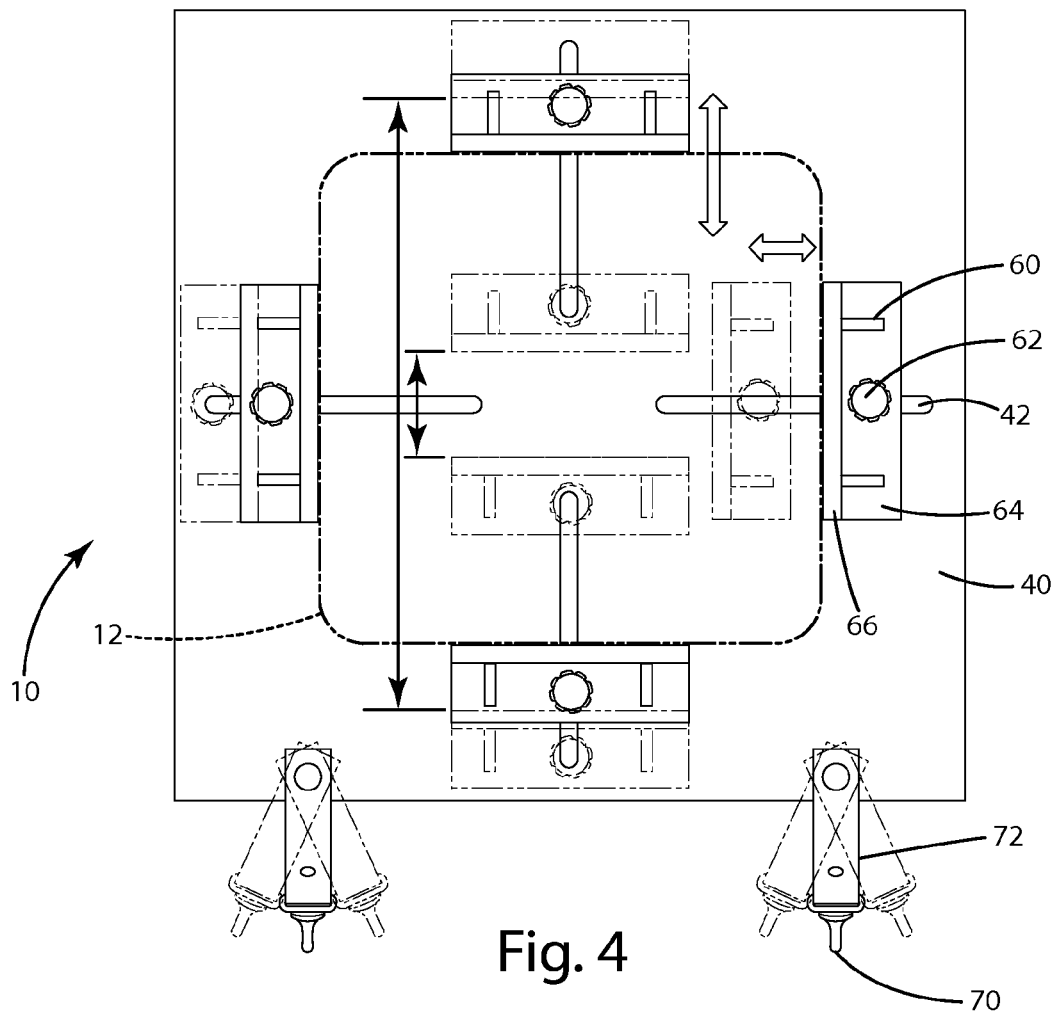
FIG. 4 is a top view of the equipment cradle in FIG. 1, with an outline showing exemplary office equipment secured therein, and movement of the support brackets on the base of the equipment cradle.
Figure 5:
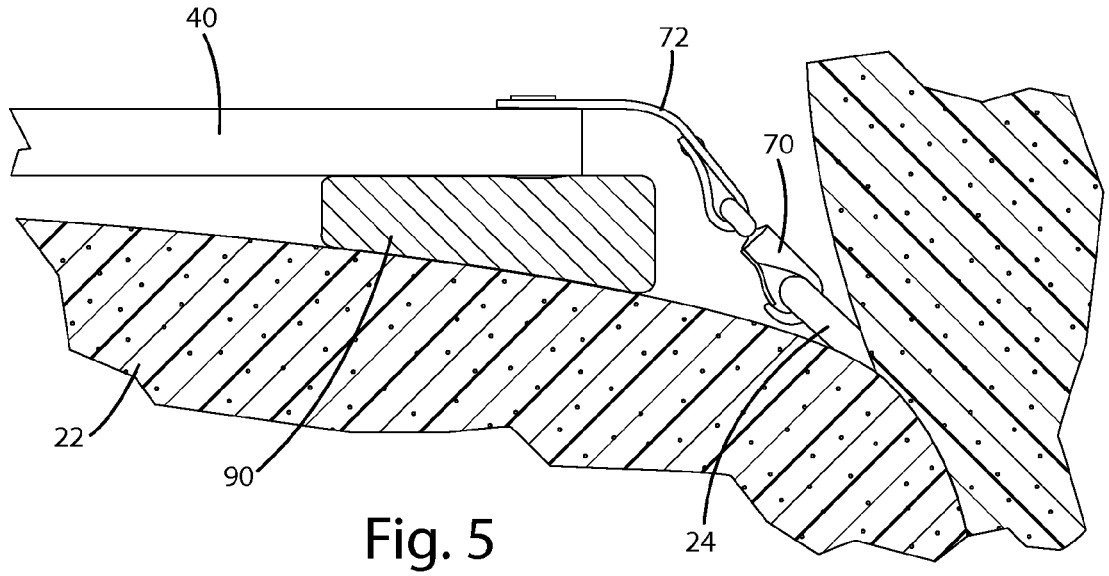
FIG. 5 is a side view of the equipment cradle in FIG. 1 and a cross sectional view of the seat and leveling block.
Figure 6:
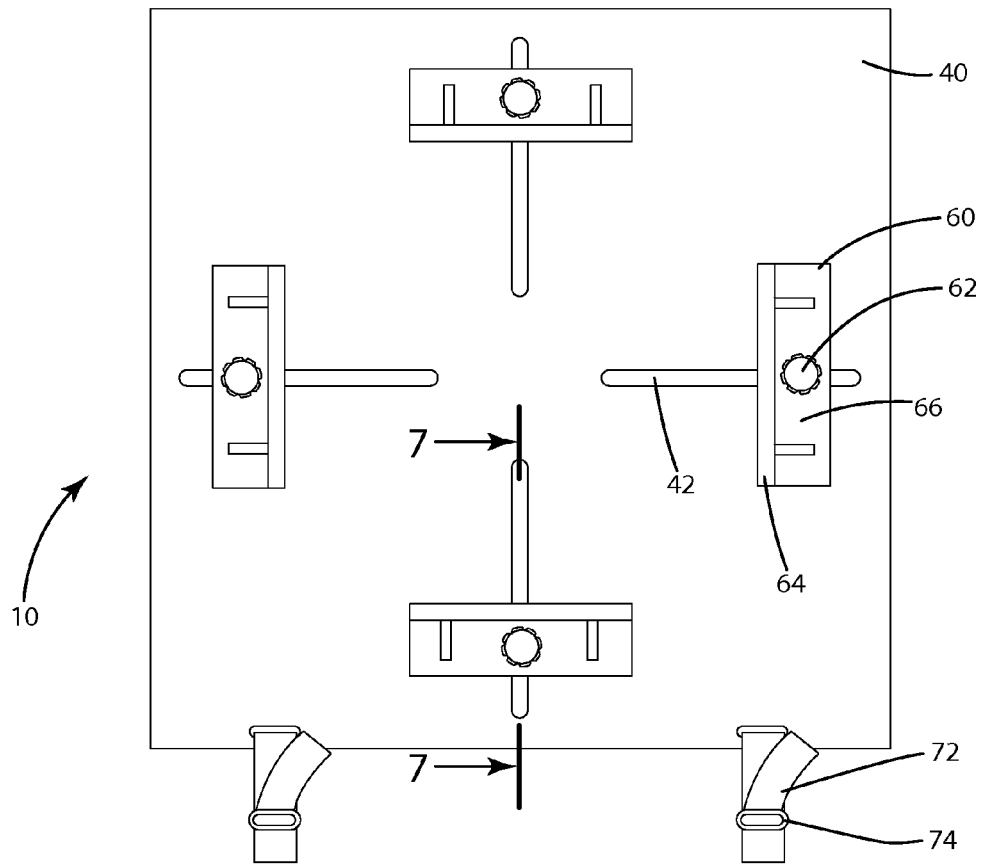
FIG. 6 is a top view of an equipment cradle.
Figure 7:
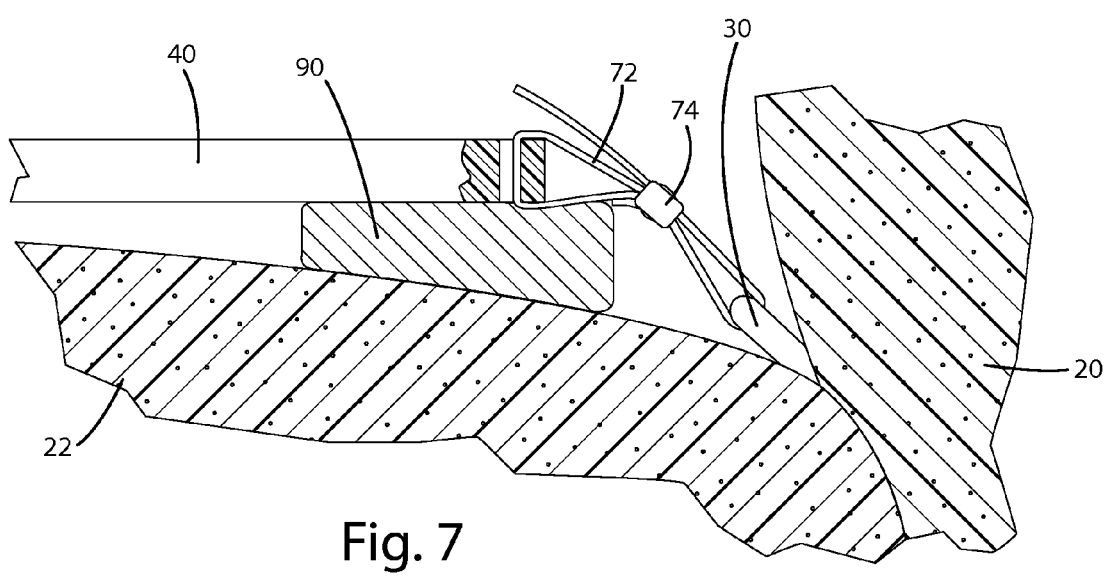
FIG. 7 is a partial cross sectional view of the equipment cradle, placed in position on a vehicle seat, along lines 7-7 in FIG. 6.
Figure 16:
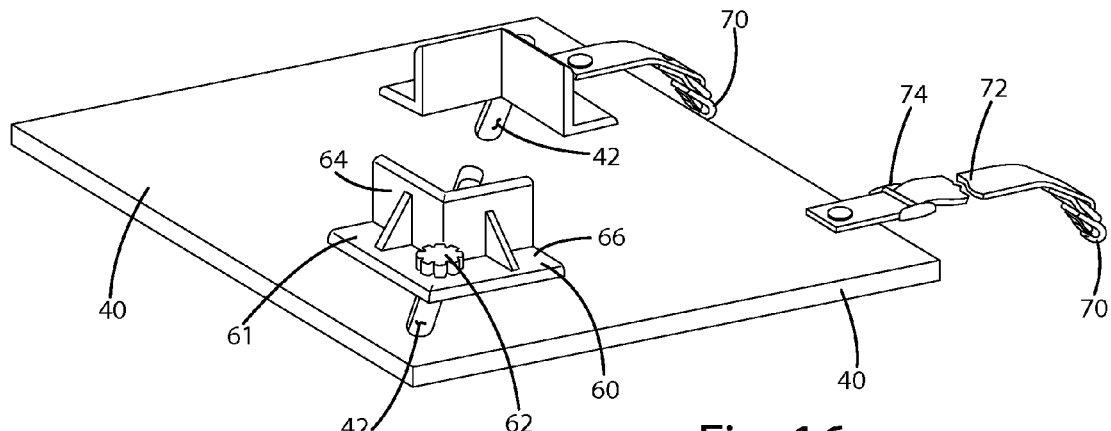
FIG. 16 is a front perspective view of an equipment cradle including corner support brackets.

The base 40 includes at least one slot 42 to allow the support brackets 60 to adjust for different equipment sizes, such as different printer sizes. For example, the configuration in FIG. 16 may be made with one of the support brackets 60 in a fixed position, while the other support bracket 60 is coupled to the base 40 through the slot 42, allowing adjustment to various sized equipment 12 such as different sizes, shapes and configurations of printers. As illustrated in FIG. 16, the support brackets 60 are L Brackets 61 that engage at least two sides of the equipment 12. As illustrated in FIGS. 1, 3, and 4 the base may include slots 42 for allowing for adjustment of each of the four support brackets 60. Of course one or more of the support brackets 60 could be permanently fixed in place with the remaining support brackets 60 being adjustable to accommodate various sized equipment 12, particularly various sized multi-function printers.

Figure 8:
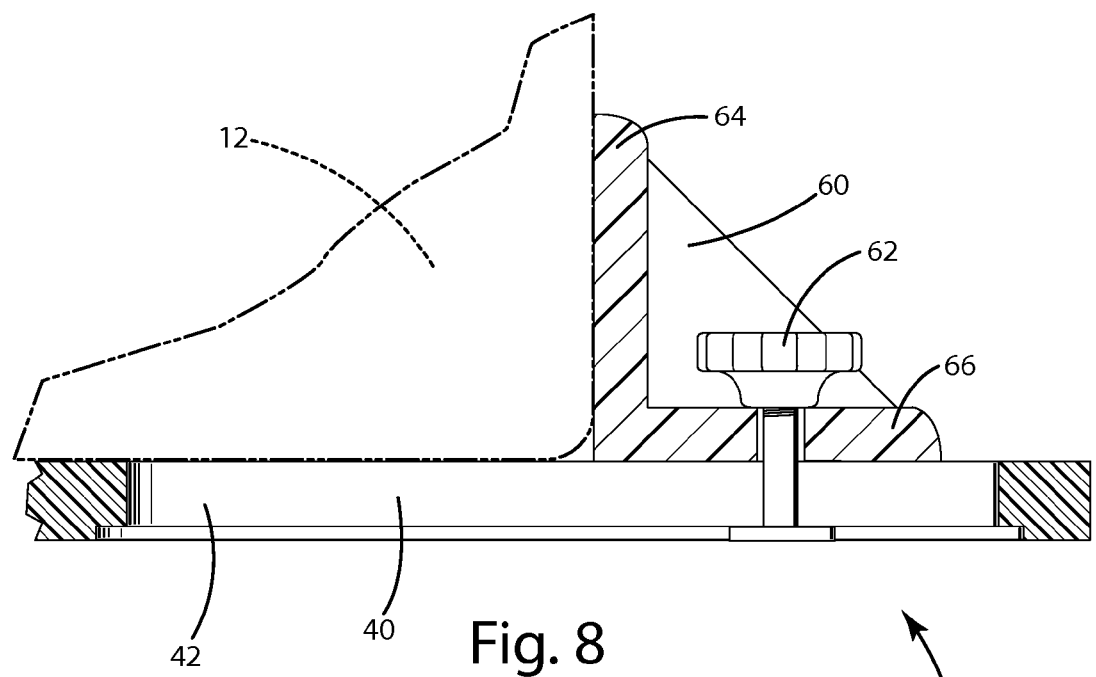
FIG. 8 is a partial cross sectional view of the equipment cradle.
Figure 9:
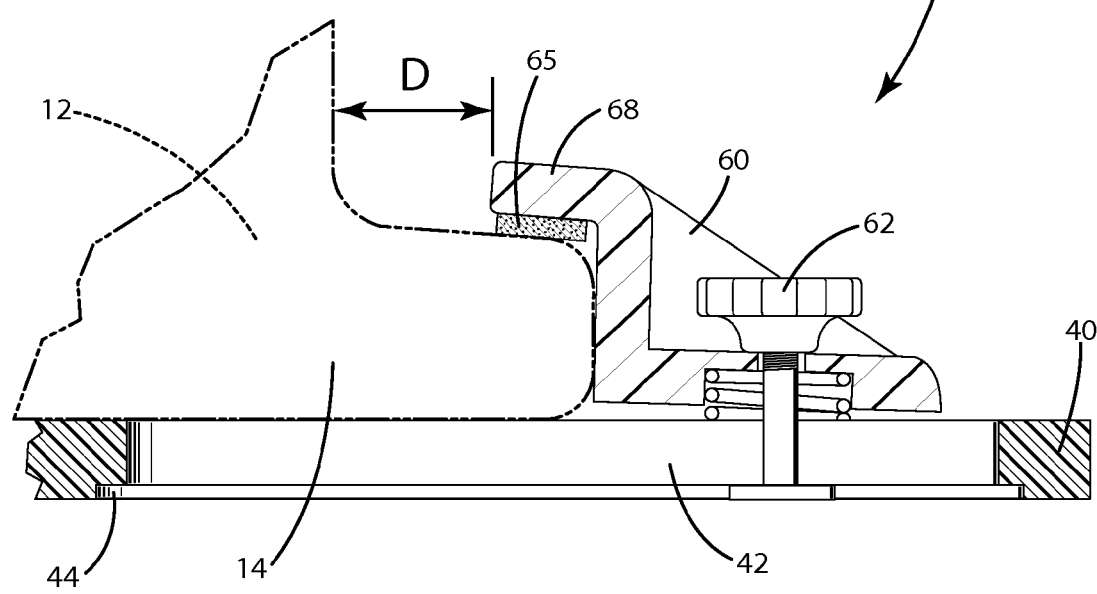
FIG. 9 is a partial cross sectional view of the equipment cradle.

The slots 42 may be configured as t-slots 44 as illustrated in FIGS. 8 and 9, which coordinate with the fastening mechanisms 62 for the brackets 60, as described below. As illustrated in the Figures, the slots may be perpendicular to each other and parallel to each other, so long as they provide a secure way of coupling the equipment to the base safely while a vehicle is in motion. Of course, other mechanisms for coupling the brackets 60 to the base and allowing adjustability may be used.

Figure 19:
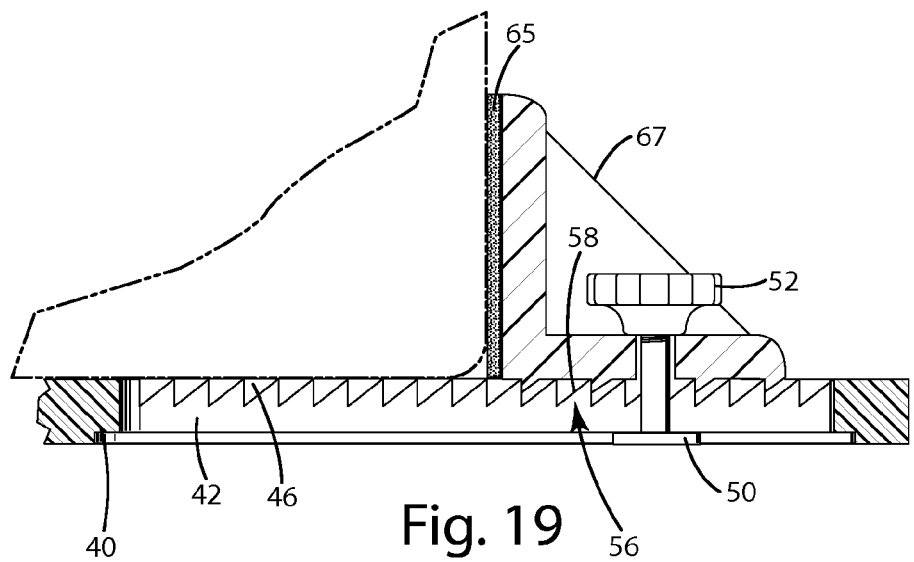
FIG. 19 is a partial sectional view of the cradle showing the self-tightening mechanism.
Figure 20:
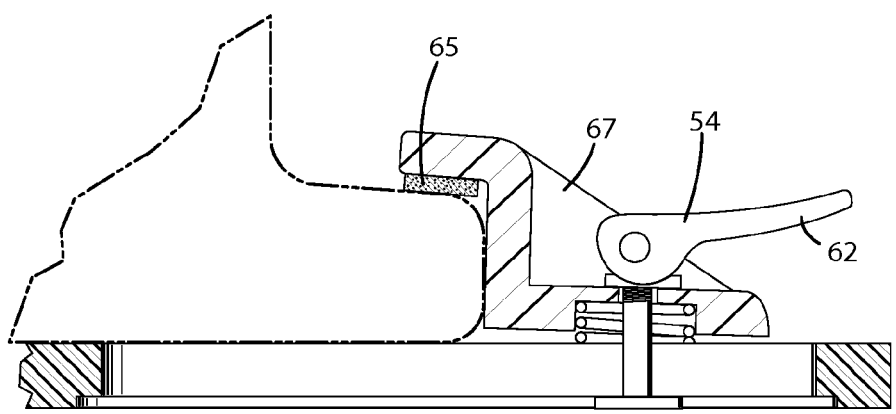
FIG. 20 is a partial sectional view of the cradle showing a cam lever as the fastening mechanism.

The brackets 60 may be configured and used in a variety of sizes, shapes and configurations and may be configured to match the profile of the equipment 12. The brackets 60 are generally coupled to the base. As illustrated in FIGS. 9, 19, and 20 a compliant material 65 may be added to protect the equipment 12 from damage and allow for tolerance differences as well as a compressive engagement to the equipment to ensure the equipment 12 is retained. The compliant material is expected to be out of a non-slip material and the thickness may vary depending on the type of material used.

As illustrated in FIG. 19, the brackets 60 and base 40 may cooperate with a self-tightening mechanism 56, such as the illustrated self-tightening protrusions 58 on the bracket 60 and the self-tightening slots 46 on the base 40. Of course, the protrusions 58 and slots 46 may be switched between the base 40 and the brackets 60. As the fastening mechanism 62 is tightened, the configuration of the self-tightening mechanism assists is pushing the bracket 60 inward against the equipment 12 to ensure a firm engagement capable of supporting the equipment 12 in most expected conditions inside a vehicle.

As illustrated in most Figures, the brackets 60 include a base leg 66 extending along the base and an equipment leg extending therefrom, in most cases approximately perpendicular or within 10 degrees, preferably within 5 degrees of perpendicular. The equipment leg 64 generally would include some form of compliant material 65 and the base leg, if included, would include part of the self-tightening mechanism 56. As illustrated in the Figures, a support 67 may extend between the base leg 66 and equipment leg 64. The support 67 may be any size, shape of configuration, but is generally configured to ensure that the forces applied by the equipment under expected vehicle operating conditions do not bend or break the equipment leg 64 from the base leg 66.

The support brackets may be made in a variety of sizes, shapes and configurations, and may be configured to match the profile of a particular piece of equipment, such as illustrated in FIGS. 9 and 20 with the bracket including an inward leg 68 that also secures the equipment toward the base 40. More specifically, because the equipment includes an outwardly protruding ledge or leg 14, the bracket 60 may include an inward leg 68 to apply a force in the direction of the base 40. Therefore, the bracket 60 as illustrated in FIGS. 9 and 20 may secure the equipment 12 to the base, such that the tie down strap 80 is not necessary. As illustrated in FIG. 16, the brackets 60 may be L-brackets 61.

Any fastener mechanism 62 may be used to secure the brackets 60 to the base 40, so long as they keep the brackets in place through expected vehicle operation. The fastener mechanism 62 may include a t-bolt 50 set within the t-slot 44 and capped by a knob 52 or a cam lever 54. The fastening mechanism 62 must cooperate between the brackets 60 and the base 40 to secure the equipment 12 in place to the base 40.

A latch system 70 configured to secure the base 40 to the seat 20, specifically the lower seat anchors 24 is included. The latch system 70 generally includes a latch strap 72 and a latch 76. The latch 76 is configured to be coupled to the lower seat anchors 24. A variety of sizes, shapes, and configurations of latches 76 may be used, so long as they may securely couple to the anchors 24. The strap 72 may vary in length, size, and shape and is generally coupled directly or indirectly to the base 40. An adjustment buckle 74 may be included to allow for easier installation of the base 40 to the seat 20.

Figure 10:
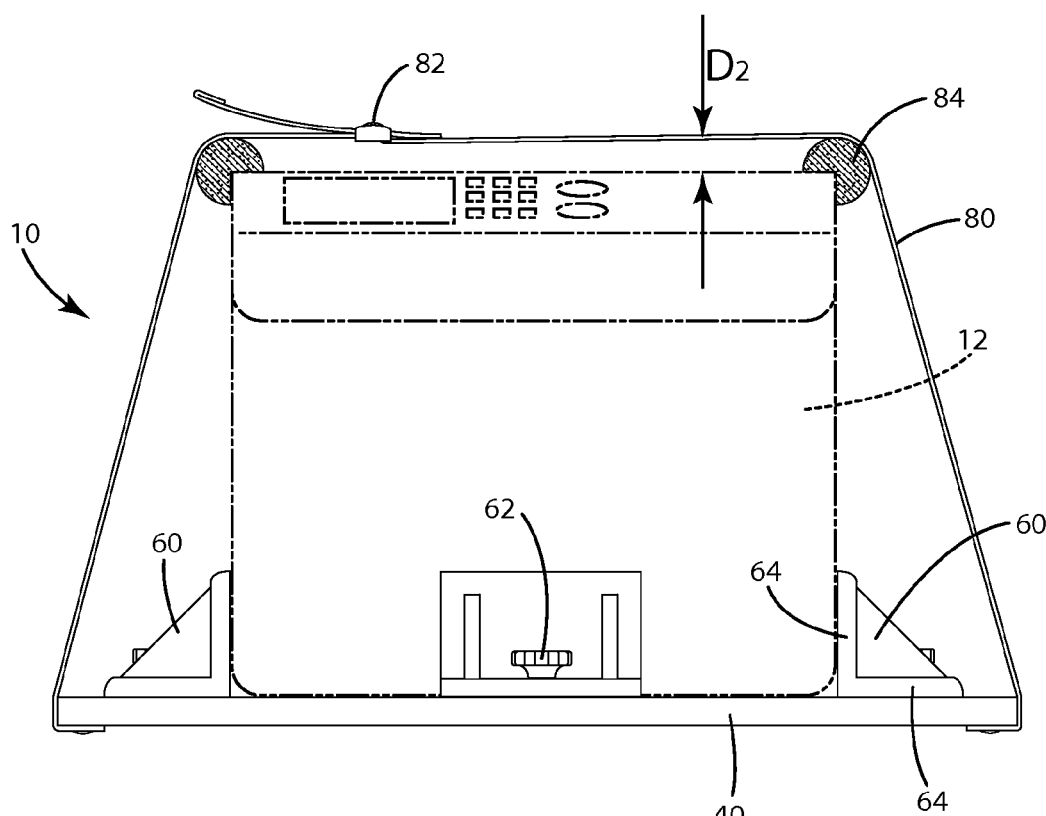
FIG. 10 is front view of the equipment cradle, including tie down strap extending over an exemplary multifunction printer.
Figure 11:
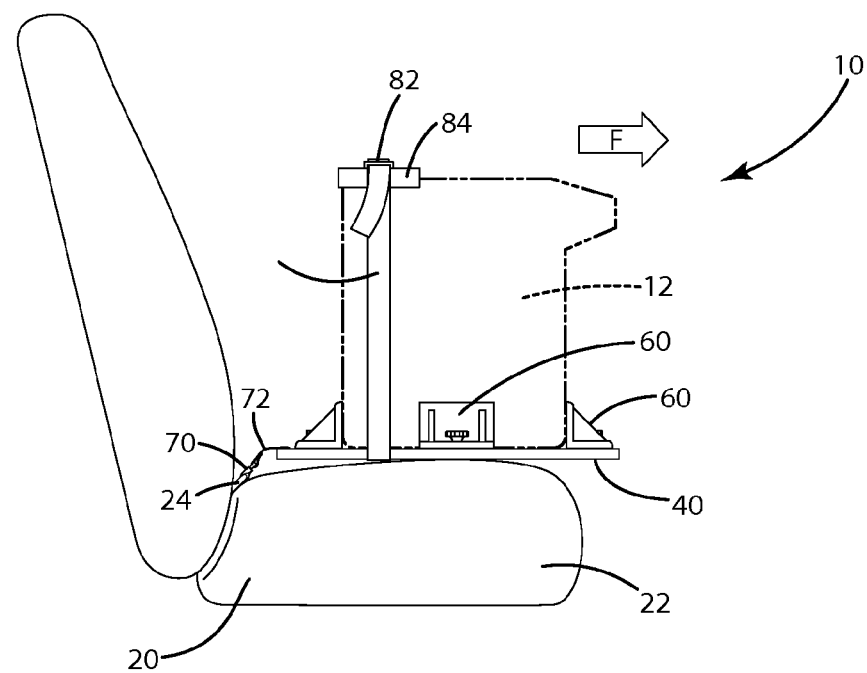
FIG. 11 is a side view of the equipment cradle in FIG. 10, placed on vehicle seat.
Figure 15:
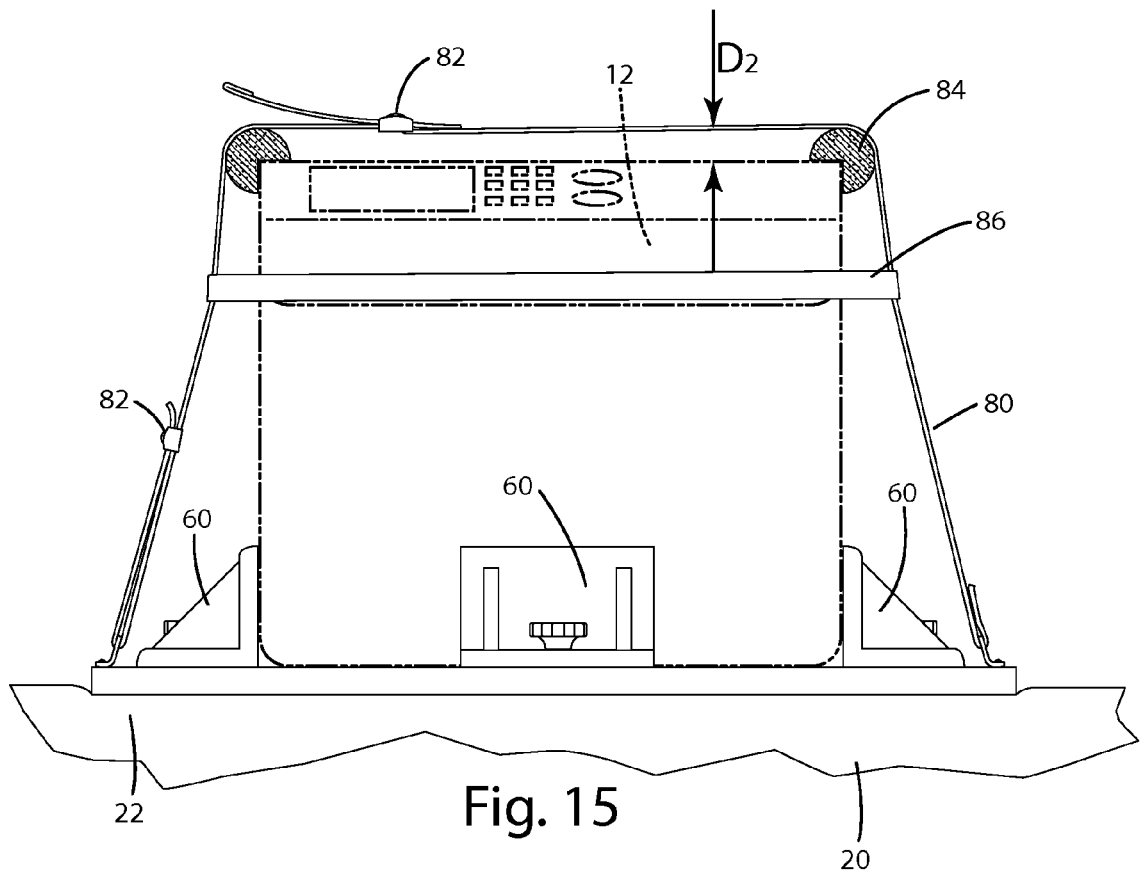
FIG. 15 is a front view of an equipment cradle with a tie down and front strap.

As illustrated in FIGS. 10 and 15 a tie down strap 80 may be included to further secure the equipment 12 to the base 40. The tie down strap 80 may have various sizes, shapes, and configurations so long as the equipment 12 is secured to the base 40 during expected vehicle conditions. The tie down strap 80 is useful when the standard brackets 60, more specifically brackets without the ability to apply downward force the equipment 12, to prevent the equipment 12 from moving away from the base 40. Because braking force is one of the strongest normal vehicle operating conditions experienced by the cradle 10, a front strap 86 may be added to counteract and support against braking force. The tie down strap 80 may include a buckle 82 for adjustment and bumpers 84 of various sized, shapes and configurations 84 may be used between the strap 80 and the equipment 12. The bumpers 84 are expected to be formed out of a compliant material and include a contour that matches the equipment, such that the bumpers 84 stay in the desired position. The exemplary bumpers 84, illustrated in FIG. 10 have a contour that is a depression in the surface.

Figure 17:
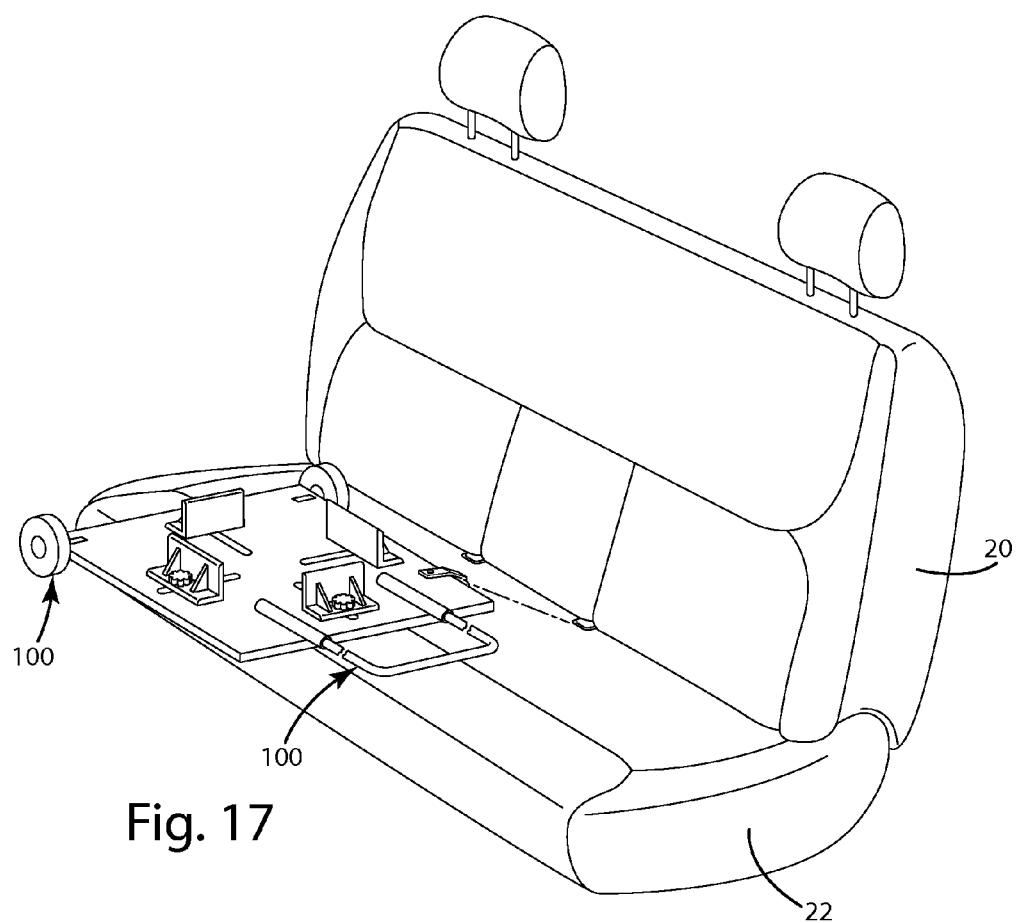
FIG. 17 is a perspective view of an equipment cradle including a trolley system.

As illustrated in some of the figures, a leveling block 90 may be used in place of the adjustable level feature 92. As further illustrated in FIG. 17, a trolley system 100 may be added having wheels 102 and a telescoping handle 104 to ease transport of heavy equipment to and from the vehicle.

The cradle 10 is only configured to work in vehicles and be supported by the seat and may be secured to the seat with the seatbelt, but preferably the LATCH restraint system.

The invention claimed is:

1. A cradle configured to securely retain and transport equipment on a vehicle seat in a vehicle, the cradle comprising:
    a base having slots;
    a first bracket and second bracket coupled to said base and configured to slide in said slots;
    at least one fastening mechanism configured to securely retain said at least one bracket from movement relative to said base; and
    a latch system having at least two latch straps extending from the base and wherein each of said latch straps terminate in a latch.

2. The cradle of claim 1 wherein said base includes a rearward edge and said at least two latch straps are coupled to said base proximate said rearward edge.

3. The cradle of claim 1 wherein said latch is configured to attach to a lower anchor and tethers for Children Restrain System in passenger vehicles.

4. The cradle of claim 1 wherein said base includes a retention area defined between said first and said second bracket.

5. The cradle of claim 4 wherein said at least one fastening mechanism extends through said at least one bracket and said slot.

6. The cradle of claim 5 wherein said slots include an enlarged recess and wherein said at least one fastening mechanism includes a stud having a head and wherein said head sits recessed relative to a lower surface of said base in said enlarged recess.

7. The cradle of claim 1 wherein one of said at least one bracket includes a first leg extending along said base and a second leg extending upwardly away from said base and said first leg.

8. The cradle of claim 7 wherein said one of said at least one bracket further includes a third leg extending from said second leg and wherein said first leg and said third leg are located on opposite ends of said second leg and wherein said first leg and said third leg extend away from opposite sides of said second leg.

9. The cradle of claim 1 further including a leveling block.

10. The cradle of claim 9 wherein said leveling block is coupled to said base and is adjustable in height relative to said base.

11. A cradle configured to securely retain and transport an equipment selected from the group consisting of a printer, a multi-function printer, and a copier, on a vehicle seat in a vehicle, wherein the vehicle seat includes Lower Anchors and Tethers for Children (LATCH) Restraint System, said cradle comprising:
    a base having a lower surface configured to engage the vehicle seat and an upper surface configured to support the equipment;
    at least two brackets coupled to said base and defining a retention area and wherein said at least two brackets engage the equipment and couple the equipment to said base in said retention area, and wherein at least one of said at least two brackets is moveable relative to said base;
    a latch system having at least two latch straps extending from said base and each terminating in a latch configured to be coupled to the LATCH restraint system to the vehicle seat; and
    at least one fastening mechanism configured to securely retain said one of said at least two brackets from movement relative to said base when fastened.

12. The cradle of claim 11 further including a leveling block coupled to said lower surface.

13. The cradle of claim 11 wherein said lower surface includes an adjustable leveling block.

14. The cradle of claim 11 wherein one of at least two brackets includes a first leg aligned with said base and a second leg extending away from said base and wherein said second leg has a first portion and a second portion angled approximately ninety degrees to said first portion.

15. The cradle of claim 11 further including a pair of wheels on one side of said base and a handle on the other side of said base.

16. A cradle configured to be securely latched from movement to the Lower Anchors and Tethers for Children (LATCH) of a vehicle seat in vehicle, said cradle comprising:
    a base having a lower surface configured to engage the vehicle seat and an upper surface, said base further including at least one slot extending between said lower surface an said upper surface;
    at least two brackets coupled to said base and defining a retention area for receiving a piece of equipment, said at least two brackets engaging said piece of equipment to secure said equipment in a retention area on said base, and wherein at least one of said at least two brackets is moveable relative to said base and said equipment;
    a latch system having at least two latch straps extending from said base and terminating in a latch configured to be coupled to the LATCH restraint system to the vehicle seat;
    at least one fastening mechanism configured to securely retain said one of said at least two brackets from movement relative to said base when fastened; and
    a tie down strap coupled to said base and wherein said equipment has an equipment base proximate to said base and an opposing upper end, said tie down strap extending from said base to proximate said opposing upper end.

* * * * *